United States Patent [19]

Silver

[11] Patent Number: 4,572,797

[45] Date of Patent: Feb. 25, 1986

[54] METHOD FOR REMOVING TRACE POLLUTANTS FROM AQUEOUS SOLUTIONS

[75] Inventor: Gary L. Silver, Centerville, Ohio

[73] Assignee: The United States of America as represented by the United States Department of Energy, Washington, D.C.

[21] Appl. No.: 471,566

[22] Filed: Mar. 2, 1983

[51] Int. Cl.$^4$ .................................................. G21F 9/04
[52] U.S. Cl. ................................ 252/631; 210/721; 210/722; 423/11; 423/92; 423/142; 423/160
[58] Field of Search ............... 252/631, 626, 627, 632; 210/717, 721, 722, 724, 737, 682; 423/2, 11, 12, 55, 142, 92, 140, 158, 160

[56] References Cited

U.S. PATENT DOCUMENTS

| | | | |
|---|---|---|---|
| 3,203,786 | 8/1965 | Wesolowski et al. | 75/82 |
| 4,006,216 | 2/1977 | Ettel | 423/592 |
| 4,086,325 | 4/1978 | Cordier et al. | 252/626 |
| 4,312,758 | 1/1982 | Berton et al. | 252/631 |
| 4,338,200 | 7/1982 | Zeijlstra | 210/737 |
| 4,377,508 | 3/1983 | Rothberg | 252/631 |

OTHER PUBLICATIONS

Lewgoy, "Submicroanalysis by Homogeneous Precipitation", Chem. Abstracts 70:111305t (1969).

Primary Examiner—Stephen J. Lechert, Jr.
Assistant Examiner—Howard J. Locker
Attorney, Agent, or Firm—Armand McMillan; Albert Sopp; Judson R. Hightower

[57] ABSTRACT

A method of substantially removing a trace metallic contaminant from a liquid containing the same comprises, adding an oxidizing agent to a liquid containing a trace amount of a metallic contaminant of a concentration of up to about $10^{-1}$ ppm, the oxidizing agent being one which oxidizes the contaminant to form an oxidized product which is insoluble in the liquid and precipitates therefrom, and the conditions of the addition being selected to ensure that the precipitation of the oxidized product is homogeneous, and separating the homogeneously precipitated product from the liquid.

7 Claims, 1 Drawing Figure

METHOD FOR REMOVING TRACE POLLUTANTS FROM AQUEOUS SOLUTIONS

The United States Government has rights in this invention pursuant to Contract DE-AC04-76DP00053 between the United States Department of Energy and Monsanto Research Corporation (Mound Facility).

BACKGROUND OF THE INVENTION

This invention relates to a method for lowering the concentration of trace contaminants in a liquid to lower concentrations tantamount to substantially complete removal of the trace contaminants. It also relates to a unique apparatus suitable for use in conjunction with the method. In a preferred aspect, the method and apparatus can be applied to the removal of trace radioactive contaminants from effluent streams.

There are many instances wherein trace contamination must be tolerated because there is no satisfactory method for removing such low concentrations both from the viewpoint of cost and effectiveness. It has generally not been possible to apply methods for removing larger concentrations of the same chemical components from liquid systems. Despite the large scope of prior art on insolubilizing chemical components in order to separate them from a liquid system, there is a relative paucity of techniques which can be applied in practice to the removal of the same chemical components when present as trace contaminants in the same or other liquid systems.

For example, it is known to remove cobalt from solutions by various oxidation techniques, often using oxidizing agents such as hypochlorite (U.S. Pat. Nos. 1,365,358 or 3,203,786), nickelic oxide (U.S. Pat. Nos. 2,377,832 or 2,726,144), etc. It is also known to prepare nickel black, i.e., remove nickel from a nickeliferous solution using the strong oxidizing agent resulting from the combination of a sulfite, e.g., calcium sulfite, and oxygen gas. See, e.g., U.S. Pat. No. 4,006,216 and Devuyst et al, Chemtech, July 1979, pp 426–427. Many other references discuss the use of the same or similar oxidizing agents to remove various oxidizable chemical components from liquid systems. See, e.g., Chemical Abstracts, 93:119835m; 92:28189s; 91:96203w; 91:7108d; 87:25437g; 84:34854m; 77:105397c; 84:126479r; 89:152107r.

All of these references have in common the fact that all involve the removal of relatively large amounts of the chemical component of interest from the respective liquid system. In general, these references are drawn to the recovery of the desired component from the system rather than the decontamination of the system. Since there is no expectation that a chemical method for recovering relatively large amounts of a chemical component can be applied to the decontamination of other systems contaminated by that component, in essence, the cited references and others of their ilk are of no help in solving the problem at hand, viz., the decontamination of systems contaminated by trace amounts of chemical constituents.

Of course, there are references which relate to decontamination methods per se. However, by and large, these also deal with achieving final contaminant amounts which exceed even the beginning contaminant concentration existing in many of the systems treated by this invention. For example, U.S. Pat. No. 4,221,766 discloses a relatively simple method for removing ferrous ions from an effluent stream by $O_2$ oxidation thereof to the ferric state. In this method, final contaminant concentrations are about 5 ppm.

There still exists a significant need for a method which enables the decontamination of liquid systems containing trace amounts of contaminants, preferably a method by which many known chemical reactions can be applied to the problem.

SUMMARY OF THE INVENTION

Accordingly, it is an object of this invention to provide a method for decontaminating liquid systems of trace contaminants.

It is another object of this invention to provide such a method which, even for very low trace concentrations, enables the achievement of a residual concentration which is yet orders of magnitude lower, i.e., which achieves a substantial removal of the contaminant.

It is yet another object of this invention to provide such a method which operates in a continuous fashion in conjunction with a running effluent stream.

It is a further object of this invention to provide such a method wherein the separated contaminant is produced in a form which is compact and which is easy to handle and store as waste material.

It is an additional object of this invention to provide such a method which is fully applicable to the removal of radioactive contaminants from liquid systems.

It is yet a further object of this invention to provide an apparatus which facilitates the operation of such a method.

Upon further study of the specification and appended claims, further objects and advantages of this invention will become apparent to those skilled in the art.

These objects have been obtained by providing a method of substantially removing a trace contaminant from a liquid containing the same comprising adding a precipitating agent to a liquid containing a trace amount of a contaminant, the precipitating agent being one which reacts with the contaminant to form a product which is insoluble in the liquid and precipitates therefrom, and the conditions of the addition being selected to ensure that the precipitation of the insoluble product is homogeneous, and separating the homogeneously precipitated product from the liquid.

They have also been achieved by providing an apparatus for use in a process for decontaminating a liquid containing a trace amount of a contaminant by homogeneous precipitation of said contaminant therefrom by addition of a precipitating agent to said liquid, comprising, a generally cylindrical tube, a reservoir in operative association with the top of said tube, means for introducing a precipitating agent into said reservoir and means for introducing said contaminated liquid into said reservoir;

means for introducing gas into the bottom portion of said cylindrical tube;

means for separating the precipitated contaminant from said liquid whereby said precipitate remains in said tube and said liquid passes therethrough, said separating means being operatively associated with said cylindrical tube below the point at which gas enters said tube from said gas introduction means; and;

means for controlling the flow rate of liquid through said tube, said control means being operatively associated with the bottom of said tube below said separating means;

wherein the diameter and length of said cylindrical tube and reservoir are selected such that homogeneous precipitation of said contaminants can be achieved at a predetermined flow rate of liquid through said tube.

BRIEF DESCRIPTION OF THE DRAWING

Various other objects, features and attendant advantages of the present invention will be more fully appreciated as the same becomes better understood when considered in conjunction with the accompanying drawing, and wherein.

DETAILED DISCUSSION

Figure 1:
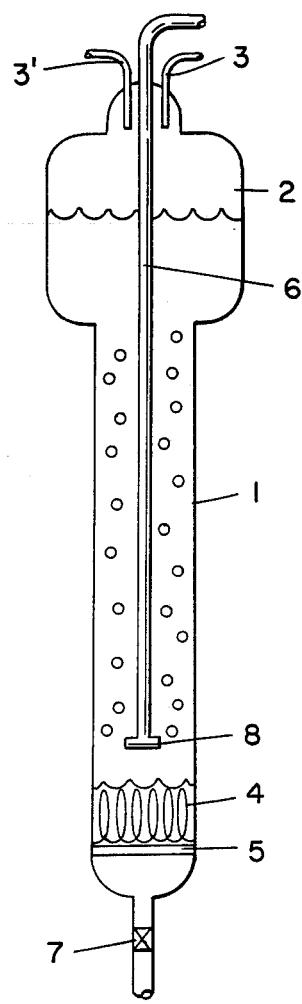
FIG. 1 illustrates an apparatus preferred for performing the process of this invention.

The term "trace" as used herein can have varied meanings depending upon the precise system involved. Under most normal circumstances, very low initial trace contaminant concentrations in the range of, e.g., the very low parts per million region such as $10^{-1}$ ppm or lower, e.g., $10^{-2}$ or $10^{-3}$ ppm, and especially lower concentrations such as $10^{-4}$ or $10^{-5}$ ppm or even lower ($10^{-6}$, $10^{-7}$, $10^{-8}$ ppm, etc.) will always be included within the scope of this invention for essentially all systems. Despite such extremely low contaminant concentrations, there are very many situations wherein these amounts still cause significant problems, especially when the contaminant is radioactive. Very surprisingly, the method and apparatus of this invention enable a significant lowering of such already relatively low concentrations, usually by many orders of magnitude. However, there will be many systems in which this invention provides a heretofore unachievable lowering of contaminant concentrations which initially are higher than such relatively low values, e.g., including initial values in the 1, 10, 100, 1000, etc. ppm ranges.

Herein, the terms "substantially removing" "substantially free", and analogous counterparts, will also vary somewhat in meaning from system to system. These terms will always imply a very significant lowering of the initial trace amount, most notably even in the cases where the initial amounts are already very low as discussed above. Usually, this will infer at least a lowering of the concentration by an order of magnitude, most often by several orders of magnitude. In all cases, it will infer that the conditions of the method have been selected in accordance with the discussion herein to guarantee that the residual amount of contaminant is acceptable under the operational criteria.

One of the primary features of this invention which enables the heretofore unachievable removal of trace contaminants is the discovery of the criticality of ensuring that the contaminant removing chemical reaction produces an insoluble product, i.e., a precipitate, under conditions which achieve homogeneous precipitation. Homogeneous precipitates are generally of a coarse structure and have low solubility and high filterability.

Of course, the meaning of the term "homogeneous precipitation" is conventional and is discussed in many basic inorganic chemistry texts. See, e.g., Gordon et al, "Precipitation from Homogeneous Solution," John Wiley, 1959; Welcher, ed., "Standard Methods of Chemical Analysis", 6th ed., vol. 2, part A, pp 139–149, 1963, D. Van Nostrand; Charlot, "Quantitative Inorganic Analysis", John Wiley, New York, 1957, page 111 or King, "Qualitative Analysis and Electrolytic Solutions," Harcourt, Brace and Company, New York, 1959, pp 178–179, all of whose disclosures are incorporated by reference herein, and many other similar texts. Furthermore, the achievement of homogeneous precipitation in many systems will require nothing more than routine experimentation by one skilled in the art who is assigned the task of achieving such a phenomenon in a defined system. Nevertheless, it is most surprising that, in the context of this invention, the application of homogeneous precipitation under the conditions required herein results in the removal as insoluble precipitates of even the trace amounts of contaminants disclosed above.

In its most generic aspect, this invention can be effected using any reagent which forms a product with the contaminant species which is insoluble in the liquid system which is usually an aqueous system. The agent can be a solid, a liquid or a gas; can be an oxidizing or reducing agent; or can be any other coreactant which meets the mentioned requirements. Typical precipitating agents include oxygen, ozone, chlorine, hydrogen, acetylene, ketene, ammonia, persulfate catalyzed by silver, hypochlorite, sulfite in combination with $O_2$, and a host of others.

It is preferred that the method be carried out using an oxidizing agent which is a hypochlorite or a combination of a sulfite and oxygen. These oxidizing agents are especially strong oxidizers and are especially compatible with the system of this invention. The following discussion will be framed primarily in terms of these preferred precipitating agents. Extrapolation of the details below to any other precipitation system can be made directly by one skilled in the art, perhaps with a few routine preliminary experiments in order to determine satisfactory ranges of parameters unique to the system at hand.

Generally, the ionic partner of the active species, e.g., the cation of hypochlorite or sulfite, must be system compatible, e.g., it must not itself be an unacceptable contaminant. Generally suitable are the alkali metals e.g., sodium, potassium, etc. or the alkaline earth metals, e.g., calcium, barium, strontium, etc., most preferably sodium or calcium. The amount of reagent in almost all cases will be precisely stoichiometric or a stoichiometric excess with respect to the initial amount of contaminant species. Whether an excess is employed will be controlled by the usual factors, including cost, compatibility, etc.

Furthermore, the amounts of reagents and, as well, all other system parameters and conditions, will be routinely selected by one skilled in the art to ensure that homogeneous precipitation is achieved upon addition of the precipitating agent to the contaminant-containing solution.

In general, the temperature of the reaction system will not be critical; any system-compatible temperature between the freezing point of the reaction medium and its boiling point can be used. Under most circumstances, it will be preferred to carry out the reaction at room temperature but, as in any other chemical reaction, precise selection of suitable temperatures will be system specific.

The time of reaction is also not critical except of course, that, in a continuous performance of the method, the residence time must be chosen to permit homogeneous precipitation. Numerical ranges of suitable residence times will vary from reaction chamber to reaction chamber but can be selected in accordance with the usual considerations, perhaps with reference to the examples herein.

It is also possible to add other reaction adjuvants or other coreactants where necessary and where system compatibility is ensured. For example, often, the reaction will be optimized by conduction in a given pH range. Typically, for example, oxidizing agents are employed at alkaline pH's. For the hypochlorite oxidizing agent of this invention, a suitable pH range will be about 3 to about 13, preferably at the alkaline end and for the sulfite/$O_2$ agent, a suitable pH range will be about 5 to about 13, again preferably in the alkaline range.

One example of the use of a suitable coreactant is the coaddition of a nickelous system-compatible salt during the calcium sulfite/$O_2$ oxidation. Preferably, the salt is $NiCl_2$. The amount of $NiCl_2$ will not be critical, 1–5 mg per liter of sulfite solution sufficing. In this regard, see, e.g., U.S. Pat. No. 4,006,216, and the cited Devuyst et al reference, whose disclosures are entirely incorporated by reference herein. Another example of a suitable coadditive is a buffer system needed to maintain the desired or necessary pH range. Again, the buffer system can be selected from any of the conventional systems as long as the ingredients thereof are compatible with the reaction and the desired state of decontamination. Often, the reactant will be self-buffering as in the case of the calcium sulfite/$O_2$ system which provides a desirable pH of about 8. Another example of a coadditive is the addition of oxygen gas (e.g., as air) in the sulfite system wherein it is employed in stoichiometric excess based upon the amount of sulfite used.

In another embodiment, the primary reaction might cause the formation of a gaseous product (e.g., in the decomposition of organic materials). A coadditive can be used in turn to react with the gas to form an insoluble product, e.g., when $CO_2$ is the gas, the coadditive can be one which forms an insoluble carbonate.

As is implied from the foregoing, the method of this invention is applicable to the removal of a trace amount of any contaminant for which there exists a precipitating agent, e.g., an oxidizing agent, which can be made to insolubilize the contaminant using homogeneous precipitation conditions. Typical contaminants will be those which are oxidizable including, e.g., cobalt, nickel, thallium, manganese (II), iron (II), platinum, iridium, osmium, lead, tin, antimony, uranium (III), plutonium (III), and many others. This invention is also applicable to organic contaminants, e.g., formaldehyde, which can be insolubilized by various reactants, usually by strong oxidizing agents such as those discussed above including ozone and others, under the conditions discussed above. This will also be an especially important application since many industrial effluent streams contain organic contaminants such as solvents, byproducts, etc. As mentioned, the invention is particularly applicable to the removal of radioactive contaminants from various effluent streams. In such systems, it is most important to lower the residual concentration of radioactive elements to as great an extent as possible. Consequently, even relatively very small trace amounts which would be innocuous in almost any other system can be very detrimental where radioactivity is concerned. The types of improvements achievable by this invention are therefore most significant for such systems.

When radioactive cobalt is the contaminant, it may be preferred that non-radioactive cobalt also be present in the contaminated liquid. Accordingly, where there is no non-radioactive cobalt, it may be preferred that some be added, e.g., an amount of up to about 1000 ppm. This is an especially preferred version when interferents like phosphate are also present. Otherwise, an inferior separation of radioactive cobalt might be achieved than otherwise possible.

One especially preferred version of the method of this invention involves its performance using the apparatus described above. This enables the achievement of continuous contaminant removal in a particularly convenient manner.

The apparatus in essence is a tube (1) having a reservoir (2) disposed at its top and having the requisite inlet means (3) and (3') and a separation means (4) and (5) at its bottom. See FIG. 1. The lower tubular portion (1) will generally be cylindrical and will have a length and diameter which, in conjunction with the dimensions of the reservoir (2), will permit achievement of homogeneous precipitation in combination with the available flow rates of incoming components as well as other conventional sizing considerations including space requirements, overall flow rate requirements, cost, etc. The walls of tube (1) may be electrically charged, if desired. This will help attract the colloid particles produced by the process.

The apparatus employed in the examples herein had the following approximate dimensions: a lower tubular portion (1) length of 70 cm and a diameter of 4 cm. The cylindrical reservoir (2) had a diameter of about 8.5 cm and a length of about 17 cm. This provided a total reaction volume in operation of about 800 ml. The operational volume will be another important parameter which can be selected routinely to achieve homogeneous precipitation since it significantly impacts the ability to sufficiently slowly combine the reactants to ensure homogeneous precipitation.

FIG. 1 shows conventional methods for introducing the liquid and gaseous components and for separating the homogeneous precipitate from the flowing stream. However, of course, any other system-compatible conventional equivalent means can also be used. For the apparatus used in the examples below, conventional glass wool (4) (a plug of a length of about 4 cm) followed by a conventional glass frit (5) were employed.

FIG. 1 also shows separate introduction of contaminated liquid and precipitating agent (3) and (3'). While this will be the preferred mode of operation in most cases, it is also not necessary, other system-compatible configurations being possible. Similarly, it is not necessary to use the gas inlet tube (6) for agitation. Any other means of providing the requisite stirring of the reaction medium can be employed if gas is not required as reactant. Under most circumstances, gaseous introduction will be used for agitation. This is particularly advantageous when the gas is part of the precipitating agent as it often is in the case of oxidation, most notably with sulfite/$O_2$. In such a case, the gas should be introduced in the form of fine bubbles by means of a gas dispersion device (8) for easier dissolution. Of course, it is not necessary that the agitating gas be a reactant. Any other system-compatible inert gas can be employed.

The rates of introduction of the reactive components and any other reaction additives, the rate of introduction of gas and the flow rate of liquid through the apparatus, e.g., by adjusting the stopcock (7) or equivalent flow control means, will be determined using the same considerations discussed above, i.e., primarily to ensure homogeneous precipitation. Specific values can be selected for any system using conventional considerations, perhaps in conjunction with a few routine preliminary experiments and conventional extrapolations from the combinations of such parameters utilized in the examples below.

Because of the homogeneous precipitation which is achieved in the apparatus of this invention, or in any other embodiment of this invention, the resultant precipitate is particularly easy to separate from the solution in view of its bulky, crystalline nature. In using the apparatus of this invention, the precipitate generally grows on the side of the tube and provides relatively large periods of use before the tube becomes clogged. When such a point is reached, in order to discard or store the retained contaminant it is merely necessary to stop the flow, remove the tube, and insert another tube. The contaminant is thus obtained in a very highly concentrated form in a container very easily handled. This is a particular advantage when radioactive contaminants are involved since it very greatly expedites the handling, disposal and/or storage of radioactive waste material.

The apparatus of this invention is further advantageous because it provides a very stable system. Because of the ease of achieving homogeneous precipitation using the apparatus, the overall system is highly insensitive to outside disturbances as well as to deviations in internal parameters, including pH ranges, internal reaction medium concentrations, etc. That is, the range of system parameters within which homogeneous precipitation can be achieved is sufficiently large.

The material from which the apparatus is constructed will normally not be critical unless dictated by conventional considerations associated with the nature of the ongoing reaction, the reactants or products produced, the requirements of subsequent disposal or storage, etc. Thus, typical material from which containers for radioactive waste disposal are fabricated can be used to construct the apparatus when decontamination of radioactive effluent streams is involved. Suitable construction materials include glass, ceramics (e.g., for nuclear waste), polymers, etc.

The process of this invention obviates the prior art requirement for resins or adsorbents for effecting decontamination. After the process is terminated, there remains only the reaction tube containing the system insoluble waste, thereby greatly lowering the conventionally required volume which must be disposed of or stored. This is especially advantageous where waste from reactors or other systems are involved. Of course, as was done in the examples below, the waste material may be redissolved in a suitable solvent thereby providing a cleaned tube for reuse where this is advantageous.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLES

The following examples of the method of this invention were carried out using the apparatus of FIG. 1. The apparatus had the dimensions summarized above. The flow rate of oxygen gas into the chamber was not critical and was simply adjusted to provide sufficient turbulence for effective agitation and, when sulfite/$O_2$ was used as the oxidizing agent, it was also adjusted if necessary to ensure suspension of calcium sulfite. The flow rates of the oxidizing agent and the flow rates of the contaminant solution (Co-60 containing some non-radioactive cobalt in all of the examples) are described below.

The movement of the liquid in each case was downward through the column. The liquid emerging from the bottom of the column was analyzed conventionally after passing through the glass wool plug and the glass frit. The bottom of the gas introduction tube was placed just above the top of the glass wool plug. The fine bubbles entering the system just above the plug served to keep the liquid in the column constantly agitated. When calcium sulfite powder formed part of the oxidizing agent, it was also possible to replenish this reagent by adding the solid to the column by removing the cap at the top of the column.

As the initial charge in the experiments using sodium hypochlorite (bleach) as the oxidizing agent, a small amount of nickel (100–250 mg of $NiCl_2.6H_2O$) was dissolved in water and oxidized with a few milliliters of commercial bleach (12.5% NaClO) to provide an oxidizing agent solution. Of course, the experiments could have been equivalently performed using other convenient initial charges. In general, the reservoir of the cobalt-60-containing contaminated solution contained about 4 gallons of the specific solution described in each example. In most cases, the drop rate of contaminated solution was about 10 drops per 1 drop of oxidizing solution.

Throughout the operation of the column, a dense, black crystalline solid gradually appeared on the inside surfaces of the apparatus. At the end of the experiments, this solid was easily dissolved in hydrochloric acid, thereby providing a rapid and convenient means for decontamination of the column so that it could be reused.

The initial concentration of radioactive cobalt in the solution used in the following examples was about $10^{-8}$ milligram per milliliter. The count rates given in the following examples, of course, correspond only to the radioactive cobalt involved. There is some non-radioactive cobalt present and this is not measured. However, the relative depletion of the non-radioactive cobalt should be the same as that of the radioactive cobalt.

The final radioactive cobalt concentration emanating from the tube was about $3 \times 10^{-12}$ milligram per milliliter. That is, the initial radioactive cobalt concentration was about 0.00001 or $10^{-5}$ ppm and the final cobalt concentration was about 0.000000003 or $3 \times 10^{-9}$ ppm. All count rates were obtained by the liquid scintillation technique. These minuscule concentrations represent a dramatic improvement in the art. For example, the related chemistry used in the process of U.S. Pat. No. 4,006,216 achieves a residual cobalt concentration of only about 0.0123 mg/ml or $10^{-2}$ ppm.

For each example, see the respective following table.

EXAMPLE 1

This example was carried out under less than optimum conditions. Yet, as can readily be seen from the count rate of the effluent, there is an extremely dramatic decontamination effected. The lack of optimization was due to the concentration of the bleach solution which was more concentrated than necessary. As a result, the glass wool plug which was only about ¼ inch thick soon became saturated, permitting the black precipitate of cobalt and nickel oxides to soon bypass the plug and reach the glass frit. By sample number 33, the frit began to clog and by sample number 35 (not shown) the rate of flow was very slow. The glass wool plug also accummulated gas bubbles, causing gas to appear in the column below the frit. The latter effect was attributed to decomposition of the bleach. The important fact, however, is that the system was extremely effective in decontaminating the cobalt solution.

EXAMPLE 2

In this case, the column employed in example 1 was cleaned and packed with a new 4-inch glass wool plug. The size of the glass wool plug in example 1 was deemed to be insufficient. In addition, the concentration of the bleach was diminished by a factor of 10.

EXAMPLE 3

As in all of these decontamination examples, a black substance slowly appears on the inner surface of the apparatus. During the experiment summarized below, a large piece broke off the side and fell to the glass wool plug. However, the system remained stable and successful decontamination still continued. Furthermore, as noted at the sample 67 point, the gas cylinder was discovered in an empty condition and had been empty for an unknown period of time. The system still remained in stable condition and decontamination still continued with minor effect, again demonstrating the system's stability.

EXAMPLE 4

This example was conducted using the same procedure as those of the foregoing examples except for the differences noted in the following table. In this case, millimolar borate, phosphate and carbonate were added to all bleach samples. This provided a test to determine the effect of these common constituents of waste water on the overall decontamination process. As can be seen, the method still provided very significant decontamination but not as high as the decontamination observed in the absence of these other contaminants. As will be noted in the table, the data indicated an optimum pH range when phosphate and carbonate are present, i.e., between 10 and 11. Of course, the nature of this experiment is somewhat artificial since solutions which are millimolar in carbonate and phosphate will not likely contain relatively substantial amounts of dissolved polyvalent metals. Most phosphates and carbonates of polyvalent metals are insoluble in aqueous solutions.

EXAMPLES 5 and 6

These examples employed calcium sulfite and oxygen to oxidize cobalt-60 instead of hypochlorite. A coaddition of nickelous chloride was also made in order to demonstrate the use of coadditives in the process. This can also be effected in the absence of the nickel salt. The stepwise addition of replenishment calcium sulfite was made by direct addition of the designated amount of solid through the top of the column. The sample size collected for analysis was 500 ml and the calcium sulfite additions were made near the beginning of the sample collection as shown in the tables.

In example 6, at sample 25, the oxygen tube accidentally broke during introduction of the calcium sulfite. The tube fell onto the top of the glass wool plug. Although the tube was withdrawn and sealed to the column cap with epoxy glue, the column continued to operate uninterrupted despite the 15-minute interruption in the oxygen flow. Furthermore, at sample 26, a leak was discovered in the epoxy seal causing another 10 minute disruption of the oxygen flow to repair this leak. As the data in the table show, despite these somewhat catastrophic events, the system remained stable and highly effective decontamination continued. This again demonstrates the remarkable stability of the overall method especially using the particular apparatus described herein. The white solid appearing at example 69 was solid, excess calcium sulfite. The rate was increased by adjustment of the stopcock at the bottom of the column. At sample 48, it was necessary to diminish the rate of flow using the stopcock since the rate of flow began to increase as the accummulated calcium sulfite at the top of the glass wool plug slowly began to dissolve. This again demonstrates the high stability of the overall system and the ease of making adjustments on-line in order to optimize conditions.

EXAMPLE 7

Properties of Oxygenated Sodium Sulfite Solutions

Mixtures of sulfur dioxide and oxygen are known to be more powerful oxidizing agents than oxygen alone. Aerated or oxygenated solutions of sodium sulfite or calcium sulfite slurries exhibit oxidation/reduction potentials which lie outside the region of the thermodynamic stability of water. It is presently believed that the effective oxidizing agent is the anion of Caro's acid, i.e., $SO_5^{2-}$, formed by the action of molecular oxygen on the sulfite anion. Whatever the precise nature of the oxidant, it is sufficiently powerful to oxidize nickel to nickelic oxide, $Ni_2O_3$, or nickel (III) hydroxide, $Ni(OH)_3$. These high-valence nickel compounds remove nickel from solution by precipitation. In turn, the precipitated nickel compound can be used to remove cobalt from solution in accordance with the following:

$$Co^{2+} + Ni(OH)_3 = Co(OH)_3 + Ni^{2+}$$

Alternatively, cobalt may be precipitated directly as the trivalent hydrous oxide by oxidation with a mixture of sulfite and oxygen as demonstrated above.

In order to further characterize the chemical and physical properties of oxygenated sulfite solutions, several experiments were performed. 2 grams of sodium sulfite were dissolved in a liter of distilled water. A buffer solution was prepared by dissolving 0.01 mole of potassium carbonate and 0.01 mole of potassium dihydrogen phosphate in a liter of water. A few pellets of potassium hydroxide were added to this buffer solution. One-to-one mixtures of the buffer and sulfite solutions were oxygenated by passing oxygen gas, dispersed as small bubbles, through the solution for several minutes. The extent of the oxidation of the sulfite was qualitatively measured by observing the potential of a platinum indicator electrode placed in the solution. As noted, the potential of the indicator electrode often rose to values which exceeded the theoretical value of the potential $O_2/H_2O$ couple at the pH of the oxidation. Often, one-half hour was required to obtain these potentials when the pH of the sulfite-buffer solution was between 11 and 13. Sometimes the high potential values were obtained more quickly. It was observed that at least several minutes of oxygenation were required before the potential of the indicator electrode would begin to climb to high values. The high values were not achieved in all cases. The more dilute sulfite solutions normally required shorter times to reach the high potential values. Vigorous stirring seemed to diminish the probability of successful oxidations under the particular conditions used in these characterizing experiments. Of course, as noted above, under the conditions of the actual performance of the method of this invention in the apparatus of this invention, no corresponding difficulties were observed.

When a small amount of solid sodium sulfite was added to an oxidized solution of sodium sulfite, immediate depression of the potential was observed. This is due to the theory that excess sulfite destroys the active $SO_5^{2-}$ species:

$$SO_5^{2-} + SO_3^{2-} = 2SO_4^{2-}$$

At pH 11, a similar depression of the potential was observed upon addition of 0.1 g of disodium methylenediaminetetraacetic acid. The rate of potential decrease here was less than observed with sodium sulfite.

An aliquot of a 1:1 mixture of the sodium sulfite and buffer solution was adjusted to pH 11.5–12.5 with potassium hydroxide and was oxygenated. To this solution, which initially indicated a potential between 790 and 800 mV (vs. the normal hydrogen electrode), were added pellets of KOH to raise the pH of the solution to about 13. The flow of oxygen gas was not interrupted during this pH adjustment. The pH of the solution was then changed by addition of a few drops of hydrochloric acid and the potential again recorded. As a result, the functional dependence between the pH and potential was obtained. The results demonstrated that the potential of the oxidized sulfite solution was about 200 mV above the theoretical potential of the $H_2O/O_2$ couple throughout the measured pH range of 9–13. That is, the potential of the oxidized sulfite solution lies outside the region of the thermodynamic stability of water, indicating its capability of producing chemical reactions not ordinarily possible in an aqueous system. Above a pH of about 10, the dependence between oxidizing potential and pH was approximately linear with a slope of $-61.4$ mV/pH. Below a pH of 10 the readings became unstable and began to drift. In similar testing on another specimen of the same oxidized sulfite solution, similar results were obtained. Above a pH of 10 the functional dependence between the potential and the pH was approximately linear with a slope of about $-61.3$ mV/pH. Below the pH value of 10, the slope of the line changed. Between pH values of about 8 and 2.3, the slope was about $-49.15$ mV/pH.

In another experiment, a 1:1 mixture of sodium sulfite and buffer solution was oxidized with oxygen. Potential readings as a function of pH were recorded. Again, at a pH above 10 a straight line was observed. Near pH 8.5 the potential readings became erratic. The solution pH was then increased by adding KOH pellets. Oxygenation continued until the potential reached 770 mV, where potential values were again recorded as a function of pH. Another straight line was obtained which was not coincident with the first straight line but was more or less parallel thereto. The oxidation potential values were somewhat higher than those originally measured. This lack of coincidence probably reflects factors such as differences in the concentration of the electroactive species in the two experiments.

If the oxidant in solutions of oxidized sulfites is $SO_5^{2-}$, it may be conjectured that the reduction of this species to sulfate or sulfite is the potential determining redox couple:

$$SO_5^{2-} + 2H^+ + 2e = SO_4^{2-} + HOH \quad (1)$$

$$SO_5^{2-} + 4H^+ + 4e = SO_3^{2-} + 2HOH \quad (2)$$

The Nernst equation for the $SO_5^{2-}/SO_4^{2-}$ couple is $$E = E^o + \frac{60}{2} \log \frac{[SO_5^{2-}]}{[SO_4^{2-}]} + \frac{60}{2} \log[H^+]^2 \quad (3)$$

while for the $SO_5^{2-}/SO_3^-$ couple it is $$E = E^o + \frac{60}{2} \log \frac{[SO_5^{2-}]}{[SO_3^{2-}]} + \frac{60}{4} \log[H^+]^4 \quad (4)$$

(In equation (3) and (4), "E" prepresents potential in millivolts.) Since pH = $-\log[H^+]$, both equations (3) and (4) predict a slope of $-60$ mV/pH for a line connecting (pH,E) points if the ratio of the concentrations of oxidized to reduced species is constant. The predicted value of the slope of the line connecting experimental (pH,E) points for either equation (1) or (3) is therefore close to the experimentally observed values. These data show the consistency of the theory that the active species is $SO_5^{2-}$ and that the reduced form of the species could be either sulfate or sulfite. The preferred choice at this stage seems to be $SO_5^{2-}/SO_3^{2-}$ since all common redox systems involving sulfate are irreversible and do not ordinarily display the Nernstian behavior shown in the experiments described above.

In another experiment, portions of a 1 g/liter solution of sodium sulfite buffered at selected pH values were treated with oxygen gas for 15 minutes. At the end of each period, the potential and pH were recorded. The data are shown below.

| pH    | E (mV) |
|-------|--------|
| 13.05 | 720    |
| 12.50 | 703    |
| 12.03 | 712    |
| 11.50 | 738    |
| 11.04 | 386    |
| 10.45 | 332    |

These data suggest that, if high potentials are desired in a 1 g/liter solution of sodium sulfite which has been oxygenated not more than 15 minutes, the pH of the solution should be greater than 11.

At a pH of 12.5 a small amount of solid calcium sulfite was added to an oxidized solution of sodium sulfite. There was an immediate drop in the solution potential. This is presumed to result from the following reaction sequence:

$$CaSO_3 + CO_3^{2-} = CaCO_3 + SO_3^{2-}$$

$$SO_3^{2-} + SO_5^{2-} = 2SO_4^{2-}$$

Attempts to produce high potentials in slurries of calcium sulfite in water were not successful. This is probably due to the fact that calcium sulfite is sufficiently soluble to maintain a concentration of sulfite ions in solution which is sufficient to destroy $SO_5{}^{2-}$ via the second reaction shown immediately above. However, when a small amount of nickel chloride is added to the slurry and the pH of the slurry is adjusted to 8 with alkali, a rapid rise in the potential is observed. A black precipitate also ensues soon after oxygenation is begun. (pH,E) points were measured for a slurry bf $NiCl_2$./$CaSO_3$ as described above. The solutions were made alkaline by adding a few drops of aqueous KOH. Again, linear functionality between pH and oxidation potential was observed at the higher pH values. Precise details of the data seem to be highly dependent upon the precise conditions involved in each case. However, nothing more than routine experiments were required to obtain the data under any circumstances.

In order to estimate the solubility of commercially available calcium sulfite (City Chemical Corp. of New York, New York), aqueous slurries were prepared and kept in stoppered bottles for one week. To one of these slurries, a pellet of potassium hydroxide was added. The bottles were frequently shaken during the equilibration period. At the end of this period, samples of the clear, supernatant liquids were withdrawn for analysis. The solution to which the pellet of KOH had been added contained 652 ppm of calcium, whereas the other solution contained 680 ppm of calcium. Neither solution contained more that trace concentrations of sulfite, but did contain 1540 and 188 ppm sulfate, respectively.

EXAMPLE 8

In other experiments, a strontium solution was prepared containing 1058 ppm of strontium. When 50 ml of this solution was treated with 1 g of calcium sulfite, the strontium concentration was reduced to 82 ppm.

A thallium (I) solution was prepared in 1M KOH. When 50 ml of this solution was treated with 1 g of calcium sulfite and oxygenated for 20 minutes, the thallium concentration was reduced from 364 ppm to 217 ppm. When a small amount of nickel was added to a similar mixture, and this mixture was oxygenated for 20 minutes, the solution which resulted contained less than 1 ppm of thallium.

The preceding examples can be repeated with similar success by substituting the generically or specifically described reactants and/or operating conditons of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

EXAMPLE #1

Decontamination of Co-60 solution with bleach

Activity of Feed Solution: 31,100 counts/min/ml, 1 g $MgCl_2$ in 4 gallons of solution
Bleach Solution: 12.5% NaClO
Co-60/bleach ratio: 10 drops Co-60 solution/1 drop bleach solution
Initial Column Charge: 100 mg $NiCl_2.6H_2O$ oxidized with bleach (NaClO) solution

| Sample # | Sample Volume (ml) | Time to Pass Sample (seconds) | Count Rate per 10 ml of Effluent | pH of Effluent | Remarks |
|---|---|---|---|---|---|
| 1 | 100 | 1125 | 121 | 11.12 | |
| 2 | 100 | 1018 | 296 | 11.25 | |
| 3 | 100 | 1030 | 170 | 11.42 | |
| 4 | 100 | 1020 | 149 | 11.43 | |
| 5 | 100 | 1024 | 97 | 11.43 | |
| 6 | 100 | 1020 | 131 | 11.47 | |
| 7 | 100 | 1024 | 67 | 11.61 | |
| 8 | 100 | 1024 | 51 | 11.58 | |
| 9 | 100 | 1032 | 55 | 11.56 | |
| 10 | 100 | 1035 | 48 | 11.55 | |
| 11 | 100 | 1023 | 40 | 11.52 | |
| 12 | 100 | 1044 | 96 | 11.68 | |
| 13 | 100 | 1050 | 56 | 11.67 | |
| 14 | 100 | 1058 | 70 | 11.64 | |
| 15 | 100 | 1039 | 105 | 11.61 | |
| 16 | 100 | 836 | 105 | 11.59 | |
| 17 | 100 | 1126 | 463 | 11.58 | |
| 18 | 100 | 1003 | 62 | 11.59 | |
| 19 | 100 | 923 | 219 | 11.67 | |
| 20 | 100 | 938 | 50 | 11.66 | |
| 21 | 100 | 957 | 59 | 11.65 | |
| 22 | 100 | 1011 | 81 | 11.65 | |
| 23 | 100 | 1002 | 137 | 11.67 | |
| 24 | 250 | 2655 | 48 | 11.50 | |
| 25 | 250 | 2929 | 176 | 11.55 | |
| 26 | 250 | 2533 | 51 | 11.56 | |
| 27 | 250 | 2626 | 55 | 11.56 | |
| 28 | 250 | 2642 | 49 | 11.56 | |
| 29 | 250 | 2599 | 53 | 11.54 | |
| 30 | 250 | 2736 | 64 | 11.58 | |
| 31 | 250 | 2813 | 53 | 11.55 | |
| 32 | 250 | 3161 | 81 | 11.54 | |
| 33 | 250 | 4145 | 1306 | 11.55 | |

Initial Column Charge: 100 mg $NiCl_2.6H_2O$ oxidized with bleach (NaClO) solution

EXAMPLE #2

Activity of Feed Solution: 19,848 counts/min/ml
Bleach Solution: 1.25% NaClO
Sample Size: 250 ml to sample #34, 500 ml from sample #35
Co-60/bleach ratio: 15 drops Co-60/1 drop bleach as an average. Minimum rate was 10 drops Co-60/1 drop bleach, and maximum rate was 20 drops Co-60/1 drop bleach
Column Initial Charge: 130 mg $NiCl_2.6H_2O$ oxidized with NaClO. During collection of sample #10, 20 mg more $NiCl_2.6H_2O$ oxidized with NaClO was introduced

| Sample # | Time to Pass Sample (seconds) | Count Rate per 10 ml of Effluent | Effluent pH | Remarks |
|---|---|---|---|---|
| 1 | 2361 | 36 | 11.54 | |
| 2 | 2525 | 37 | 11.57 | |
| 3 | 2525 | 38 | 11.59 | |
| 4 | 2488 | 43 | 11.59 | |
| 5 | 2460 | 48 | 11.63 | |
| 6 | 2268 | 43 | 11.66 | |
| 7 | 2231 | 40 | 11.60 | |
| 8 | 2245 | 35 | 11.54 | |
| 9 | 2239 | 25 | 11.54 | |
| 10 | 2245 | 36 | 11.52 | added 20 mg $NiCl_2.6H_2O$ (oxidized) |
| 11 | 2223 | 176 | 11.49 | |
| 12 | 2270 | 411 | 11.41 | |
| 13 | 2263 | 535 | 11.30 | |
| 14 | 2228 | 514 | 11.23 | |
| 15 | 2300 | 324 | 11.24 | |
| 16 | 2332 | 175 | 11.29 | |
| 17 | 2350 | 158 | 11.30 | |

-continued

| Sample # | Time to Pass Sample (seconds) | Count Rate per 10 ml of Effluent | Effluent pH | Remarks |
|---|---|---|---|---|
| 18 | 2335 | 117 | 11.30 | |
| 19 | 2252 | 52 | 11.32 | |
| 20 | 2294 | 40 | 11.33 | |
| 21 | 2319 | 37 | 11.37 | |
| 22 | 2336 | 36 | 11.41 | |
| 23 | 2343 | 36 | 11.43 | |
| 24 | 2319 | 32 | 11.42 | |
| 25 | 2348 | 32 | 11.40 | |
| 26 | 2294 | 30 | 11.32 | |
| 27 | 2282 | 36 | 11.32 | |
| 28 | 2295 | 28 | 11.29 | |
| 29 | 2245 | 31 | 11.27 | |
| 30 | 2303 | 31 | 11.26 | |
| 31 | 2291 | 28 | 11.20 | |
| 32 | 2276 | 32 | 11.18 | |
| 33 | 2229 | 35 | 11.05 | |
| 34 | 2339 | 42 | 11.05 | Last of 250-ml samples |
| 35 | 3515 | 37 | 11.16 | First of 500-ml samples |
| 36 | 4698 | 42 | 11.25 | |
| 37 | 4650 | 38 | 11.31 | |
| 38 | 4702 | 33 | 11.30 | |
| 39 | 4770 | 38 | 11.36 | |
| 40 | 4802 | 35 | 11.37 | |
| 41 | 4874 | 32 | 11.36 | |
| 42 | 4907 | 40 | 11.35 | |
| 43 | 4941 | 40 | 11.29 | |
| 44 | 4826 | 43 | 11.23 | |
| 45 | 4664 | 43 | 11.26 | |
| 46 | 4559 | 40 | 11.30 | |
| 47 | 4697 | 36 | 11.33 | |
| 48 | 4702 | 34 | 11.36 | |
| 49 | 4657 | 39 | 11.31 | |
| 50 | 4608 | 46 | 11.27 | |
| 51 | 4718 | 50 | 11.21 | |
| 52 | — | 42 | 11.18 | |

EXAMPLE #3

Activity of Feed Solution: 28,242 counts/min/ml containing ½ g $NiCl_2 \cdot 6H_2O$ in 4 gallons Bleach Solution: 1.25% NaClO, 0.001M in borate, pH adjusted with hydrochloric acid as indicated Sample size: 250 ml Column Charge: 200 mg $NiCl_2 \cdot 6H_2O$ oxidized with 12.5% bleach Co-60/bleach ratio: 10 drops Co-60 solution per one drop bleach

| Sample # | Time for Sample to Pass (seconds) | Count Rate per 10 ml of Effluent | pH of Effluent | Remarks |
|---|---|---|---|---|
| 1 | 2683 | 140 | 10.96 | pH 11.5 bleach |
| 2 | 2101 | 427 | 11.23 | Flow adjusted |
| 3 | 2296 | 143 | 11.38 | Flow adjusted |
| 4 | 2308 | 230 | 11.46 | |
| 5 | 2399 | 320 | 11.48 | |
| 6 | 2325 | 928 | 11.48 | |
| 7 | 2370 | 345 | 11.47 | |
| 8 | 2390 | 330 | 11.48 | |
| 9 | 2330 | 210 | 11.49 | |
| 10 | 2338 | 127 | 11.47 | |
| 11 | 2546 | 150 | 11.46 | |
| 12 | 2469 | 104 | 11.48 | |
| 13 | 2446 | 115 | 11.49 | |
| 14 | 2428 | 96 | 11.51 | |
| 15 | 2440 | 92 | 11.48 | Began pH 10.4 bleach |
| 16 | 2432 | 88 | 11.48 | |
| 17 | 2462 | 87 | 11.45 | |
| 18 | 2474 | 96 | 11.38 | |
| 19 | 2463 | 107 | 11.32 | |
| 20 | 2470 | 112 | 11.18 | |
| 21 | 2472 | 113 | 10.98 | |
| 22 | 2482 | 112 | 10.53 | |
| 23 | 2508 | 110 | 9.62 | |
| 24 | 2462 | 119 | 9.90 | |
| 25 | 2485 | 128 | 9.48 | |
| 26 | 2505 | 129 | 9.51 | |
| 27 | 2532 | 394 | 9.40 | |
| 28 | 2513 | 202 | 9.47 | |
| 29 | 2536 | 226 | 9.66 | |
| 30 | 2579 | 138 | 9.43 | Began pH 9.2 bleach |
| 31 | 2622 | 224 | 9.38 | |
| 32 | 2623 | 134 | 9.09 | |
| 33 | 2664 | 180 | 9.00 | |
| 34 | 2767 | 119 | 9.02 | |
| 35 | 2279 | 175 | 9.05 | Flow rate adjusted |
| 36 | 2316 | 119 | 8.68 | |
| 37 | 2310 | 125 | 8.80 | |
| 38 | 2287 | 98 | 8.55 | |
| 39 | 2290 | 124 | 8.37 | |
| 40 | 2267 | 98 | 8.47 | |
| 41 | 2311 | 112 | 8.47 | |
| 42 | 2280 | 98 | 8.37 | |
| 43 | 2259 | 104 | 8.43 | |
| 44 | 2228 | 106 | 8.41 | |
| 45 | 2227 | 111 | 8.40 | |
| 46 | 2216 | 109 | 8.60 | |
| 47 | 2237 | 205 | 8.38 | Began pH 7.9 bleach |
| 48 | 2240 | 142 | 8.47 | |
| 49 | 2202 | 147 | 8.24 | |
| 50 | 2218 | 116 | 8.06 | |
| 51 | 2221 | 122 | 7.94 | |
| 52 | 2232 | 108 | 7.82 | |
| 53 | 2226 | 118 | 7.81 | |
| 54 | 2248 | 108 | 7.77 | |
| 55 | 2207 | 114 | 7.72 | |
| 56 | 2219 | 111 | 7.73 | |
| 57 | 2232 | 157 | 7.68 | |
| 58 | 2227 | 133 | 7.66 | |
| 59 | 2232 | 151 | 7.48 | |
| 60 | 2239 | 114 | 7.41 | |
| 61 | 2234 | 136 | 7.53 | |
| 62 | 2244 | 121 | 7.61 | |
| 63 | 2255 | 118 | 7.64 | |
| 64 | 2250 | 119 | 7.61 | Restarted pH 11.5 bleach |
| 65 | 2247 | 120 | 7.64 | |
| 66 | 2229 | 125 | 9.18 | |
| 67 | 2272 | 179 | 10.60 | Gas cylinder discovered empty. Gas off for unknown period of time |
| 68 | 2285 | 291 | 10.88 | |
| 69 | 2287 | 206 | 11.21 | |
| 70 | 2305 | 130 | 11.30 | |
| 71 | 2321 | 104 | 11.35 | |
| 72 | 2290 | 100 | 11.37 | |
| 73 | — | 95 | 11.37 | |

EXAMPLE #4

Activity of Feed Solution: 23,940 counts/min/ml

Column Charge: 200 mg $NiCl_2 \cdot 6H_2O$ oxidized with bleach

Bleach Solution: 0.625% NaClO for first five samples, 1.25% thereafter. All bleach solutions were millimolar in borate, phosphate, and carbonate.

Co-60/bleach ratio: 10 drops Co-60/1 drop of bleach

Sample Size: 500 ml

| Sample # | Time to Pass Sample (seconds) | Count Rate per 10 ml of Effluent (counts/min) | pH of Effluent | Remarks |
|---|---|---|---|---|
| 1 | 4965 | 256 | 11.42 | |
| 2 | 4402 | 533 | 11.05 | |
| 3 | 4468 | 1027 | 11.06 | |
| 4 | 4480 | 1175 | 10.97 | |
| 5 | 4324 | 1724 | 10.97 | |
| 6 | 4236 | 3749 | 10.93 | Increased bleach to 1.25% |
| 7 | 4254 | 5105 | 10.96 | |
| 8 | 4357 | 4589 | 11.11 | |
| 9 | 4282 | 4905 | 11.21 | |
| 10 | 4186 | 5171 | 11.24 | |
| 11 | 4223 | 3793 | 11.30 | |
| 12 | 4298 | 3195 | 11.35 | |
| 13 | 4337 | 2737 | 11.36 | |
| 14 | 4371 | 3277 | 11.34 | |
| 15 | 4239 | 4849 | 11.34 | |
| 16 | 4168 | 4112 | 11.35 | |
| 17 | 4355 | 3744 | 11.37 | |
| 18 | 4317 | 3164 | 11.37 | Flow stopped |
| 19 | — | 3002 | 11.36 | Bleach pH changed to 9.5 |
| 20 | 4050 | 3096 | 11.42 | |
| 21 | 4672 | 618 | 11.02 | |
| 22 | 4365 | 515 | 10.41 | |
| 23 | 4536 | 3116 | 10.04 | |
| 24 | 4588 | 6957 | 9.88 | Bleach pH changed to 10.6 |
| 25 | 4708 | 6103 | 9.78 | |
| 26 | 4681 | 4194 | 9.83 | |
| 27 | 4653 | 1858 | 10.05 | |
| 28 | 4655 | 1101 | 10.19 | |
| 29 | 4656 | 980 | 10.26 | |
| 30 | 4663 | 1003 | 10.25 | |
| 31 | 4761 | 993 | 10.32 | |
| 32 | 4547 | 1158 | 10.37 | |
| 33 | 4689 | 1252 | 10.40 | |
| 34 | 4733 | 1201 | 10.42 | |
| 35 | 4646 | 1236 | 10.45 | |
| 36 | 4710 | 1340 | 10.46 | |
| 37 | 4330 | 1289 | 10.57 | Bleach pH changed to 10.9 |
| 38 | 4720 | 1569 | 10.66 | |
| 39 | 4687 | 1655 | 10.70 | |
| 40 | — | 1621 | 10.75 | |

EXAMPLE #5

Activity of Feed Solution: 21,087 counts/min/ml
Column Charge: 5 g $CaSO_3$ + 250 mg $NiCl_2.6H_2O$ made alkaline with a few drops of KOH
$CaSO_3$ additions: as indicated
Sample Size: 500 ml

| Sample # | Flow Time (sec) | Count Rate (counts/min/10 ml) | pH of Effluent | Remarks |
|---|---|---|---|---|
| 1 | 4797 | 19 | 10.94 | |
| 2 | 4805 | 22 | 9.91 | |
| 3 | 4816 | 25 | 9.24 | 1 g $CaSO_3$ |
| 4 | 4732 | 33 | 10.21 | 1 g $CaSO_3$ |
| 5 | 4668 | 42 | 9.35 | |
| 6 | 4633 | 61 | 8.89 | 1 g $CaSO_3$ |
| 7 | 4589 | 80 | 8.63 | |
| 8 | 4512 | 65 | 8.64 | 1 g $CaSO_3$ |
| 9 | 4527 | 81 | 8.58 | |
| 10 | 4517 | 53 | 8.73 | 1 g $CaSO_3$ |
| 11 | 4552 | 57 | 8.76 | |
| 12 | 4595 | 68 | 8.62 | 1 g $CaSO_3$ |
| 13 | 4576 | 75 | 8.51 | |
| 14 | 4561 | 104 | 8.38 | 1 g $CaSO_3$ |
| 15 | 4578 | 98 | 8.59 | |
| 16 | 4700 | 94 | 8.58 | 1 g $CaSO_3$ |
| 17 | 4828 | 78 | 8.58 | |
| 18 | 4751 | 86 | 8.62 | 1 g $CaSO_3$ |
| 19 | 4914 | 76 | 9.47 | 1 g $CaSO_3$ + 250 mg $NiCl_2.6H_2O$ + KOH |
| 20 | 5220 | 31 | 9.66 | 1 g $CaSO_3$ |
| 21 | 5240 | 27 | 9.20 | 1 g $CaSO_3$ |
| 22 | 5254 | 29 | 9.06 | 1 g $CaSO_3$ |
| 23 | 5351 | 32 | 9.01 | 1 g $CaSO_3$ |
| 24 | 5469 | 67 | 8.93 | 1 g $CaSO_3$ |
| 25 | 5511 | 60 | 8.92 | 1 g $CaSO_3$ |
| 26 | 5394 | 78 | 8.89 | 1 g $CaSO_3$ |
| 27 | 5487 | 91 | 8.76 | 1 g $CaSO_3$ |
| 28 | 5586 | 117 | 8.71 | 1 g $CaSO_3$ |
| 29 | 5616 | 100 | 8.80 | 1 g $CaSO_3$ |
| 30 | 5634 | 122 | 8.78 | 1 g $CaSO_3$ |
| 31 | 5887 | 116 | 8.82 | 1 g $CaSO_3$ |
| 32 | 6063 | 91 | 8.83 | 1 g $CaSO_3$ |
| 33 | 6192 | 127 | 8.93 | |
| 34 | 5875 | 892 | 8.93 | |
| 35 | 5694 | 1923 | 8.96 | |

EXAMPLE #6

Activity Feed Solution: 27,024 counts/min/ml containing 1 g $NiCl_2.6H_2O$ in about 4 gallons
Column Charge: 250 mg $NiCl_2$ oxidized with oxygen and 3 g $CaSO_3$ (plus small amount KOH)
Buffer: 0.01M borate, pH as indicated Co-60/buffer ratio: 10 drops Co-60 solution/1 drop buffer solution
Sample Size: 250 ml

| Sample # | Flow Time (seconds) | Count Rate per 10 ml of Effluent | Effluent pH | Remarks |
|---|---|---|---|---|
| 1 | 2483 | 224 | 10.29 | |
| 2 | 2405 | 25 | 10.20 | |
| 3 | 2403 | 36 | 9.50 | |
| 4 | 2410 | 50 | 8.81 | |
| 5 | 2360 | 59 | 8.36 | 1.5 g $CaSO_3$ |
| 6 | 2385 | 54 | 8.32 | |
| 7 | 2250 | 56 | 8.51 | 1.5 g $CaSO_3$ |
| 8 | 2270 | 52 | 8.47 | |
| 9 | 2181 | 52 | 8.12 | 1.5 g $CaSO_3$ |
| 10 | 2171 | 54 | 8.44 | |
| 11 | 2183 | 53 | 8.23 | 1.5 g $CaSO_3$ |
| 12 | 2200 | 54 | 8.41 | |
| 13 | 2159 | 70 | 8.48 | 1.5 g $CaSO_3$, started pH 9.5 buffer |
| 14 | 2140 | 99 | 8.48 | |
| 15 | 2146 | 87 | 8.62 | 1.5 g $CaSO_3$ |
| 16 | 2146 | 78 | 8.57 | |
| 17 | 2166 | 70 | 8.60 | 1.5 g $CaSO_3$ |
| 18 | 2178 | 63 | 8.78 | |
| 19 | 2189 | 60 | 8.81 | 1.5 g $CaSO_3$ |
| 20 | 2199 | 57 | 8.80 | |
| 21 | 2216 | 64 | 8.82 | 1.5 g $CaSO_3$ |
| 22 | 2230 | 60 | 8.83 | |
| 23 | 2233 | 61 | 8.79 | 1.5 g $CaSO_3$ |
| 24 | 2264 | 59 | 8.79 | |
| 25 | 2203 | 61 | 8.711 | 1.5 g $CaSO_3$; oxygen tube broke, no oxygen for 15 minutes Start pH 10.6 buffer |
| 26 | 2241 | 423 | 8.77 | Oxygen off for 10 more minutes to reseal broken tube |
| 27 | 2235 | 159 | 8.74 | 1.5 g $CaSO_3$ |
| 28 | 2225 | 105 | 8.73 | |
| 29 | 2229 | 76 | 8.81 | 1.5 g $CaSO_3$ |
| 30 | 2310 | 76 | 8.86 | |
| 31 | 2318 | 66 | 8.91 | 1.5 g $CaSO_3$ |
| 32 | 2315 | 67 | 8.93 | |

-continued

| Sample # | Flow Time (seconds) | Count Rate per 10 ml of Effluent | Effluent pH | Remarks |
|---|---|---|---|---|
| 33 | 2319 | 63 | 8.96 | 1.5 g CaSO$_3$ |
| 34 | 2296 | 60 | 8.96 | |
| 35 | 2333 | 63 | 8.94 | 1.5 g CaSO$_3$ |
| 36 | 2389 | 62 | 8.94 | |
| 37 | 2470 | 56 | 8.96 | 1.5 g CaSO$_3$, began pH 12.2 buffer |
| 38 | 2512 | 61 | 8.96 | |
| 39 | 2755 | 63 | 8.99 | 1.5 g CaSO$_3$ |
| 40 | 3060 | 62 | 9.32 | |
| 41 | 3165 | 58 | 9.62 | 1.5 g CaSO$_3$, buffer turned off |
| 42 | — | 59 | 9.28 | |
| 43 | 3626 | 58 | 9.01 | |
| 44 | 2341 | 63 | 8.72 | Flow rate adjusted with stopcock |
| 45 | 2418 | 62 | 8.65 | |
| 46 | 2214 | 70 | 8.57 | |
| 47 | 1949 | 82 | 8.54 | |
| 48 | 1836 | 75 | 8.55 | Flow rate adjusted with stopcock |
| 49 | 2588 | 71 | 8.48 | |
| 50 | 2646 | 67 | 8.56 | |
| 51 | 2295 | 62 | 8.54 | Flow rate adjusted with stopcock |
| 52 | 2141 | 64 | 8.52 | |
| 53 | 2139 | 63 | 8.61 | |
| 54 | 2015 | 59 | 8.65 | |
| 55 | 1995 | 71 | 8.57 | |
| 56 | 1984 | 71 | 8.58 | |
| 57 | 1956 | 67 | 8.52 | |
| 58 | 1990 | 78 | 8.46 | |
| 59 | 2006 | 78 | 8.44 | |
| 60 | 2037 | 90 | 8.57 | pH 12.2 buffer restarted |
| 61 | 2176 | 209 | 8.91 | |
| 62 | 2254 | 107 | 9.32 | |
| 63 | 2362 | 86 | 9.23 | 1.5 g CaSO$_3$ |
| 64 | 2388 | 82 | 9.08 | |
| 65 | 2800 | 69 | 9.55 | 1.5 g CaSO$_3$ |
| 66 | 2137 | 64 | 9.62 | Flow adjusted with stopcock |
| 67 | 2487 | 68 | 10.03 | |
| 68 | 3122 | 64 | 10.20 | |
| 69 | 3816 | 63 | 10.49 | White solid appears to be impeding flow |
| 70 | 3853 | 66 | 10.78 | |
| 71 | 2713 | 67 | 11.31 | |
| 72 | 3220 | 65 | 11.42 | |

What is claimed is:

1. A method of substantially removing a trace metallic contaminant from a liquid containing the same, consisting of:

continuously adding an oxidizing agent to a liquid containing up to $10^{-2}$ ppm of the contaminant to form an oxidized product which precipitates therefrom, with the conditions of the addition being selected to ensure that the precipitation of the oxidized product is homogeneous; and continuously separating the homogeneous precipitated product from the liquid by allowing said precipitate to crystallize on the walls of a cylindrical container in which the method is carried out;

said contaminant being cobalt, nickel, manganese, thallium, iron (II), platinum, iridium, antimony, strontium, osmium, lead, tin, uranium, or plutonium; and said oxidizing agent being an alkali or alkaline earth metal hypochlorite or a combination of an alkali or alkaline earth metal sulfite and O$_2$.

2. The method of claim 1 wherein the contaminant is a radioactive metal.

3. The method of claim 2 wherein the contaminant is radioactive cobalt.

4. The method of claim 1 wherein the oxidixing agent is a combination of calcium sulfite or sodium sulfite and O$_2$ and the pH of the liquid is about 5–13.

5. The method of claim 4 wherein the oxidizing agent is a combination of calcium sulfite, a liquid-soluble soluble Ni$^{2+}$ salt and O$_2$.

6. The method of claim 4 wherein the oxidizing agent is sodium hypochlorite and the pH of the liquid is about 3–13.

7. The method of claim 1 wherein the contaminant is radioactive cobalt and wherein non-radioactive cobalt is added prior to oxidation and precipitation to raise the total cobalt concentration to about 1000 ppm.

* * * * *